United States Patent
Smith (10) Patent No.: US 11,640,619 B2
(45) Date of Patent: May 2, 2023

(54) MEDIA ENGAGEMENT VERIFICATION IN TRANSIT SYSTEMS

(71) Applicant: Cubic Corporation, San Diego, CA (US)

(72) Inventor: Gavin Smith, Crawley (GB)

(73) Assignee: Cubic Corporation, San Diego, CA (US)

(*) Notice: Subject to any disclaimer, the term of this patent is extended or adjusted under 35 U.S.C. 154(b) by 0 days.

(21) Appl. No.: 16/849,088

(22) Filed: Apr. 15, 2020

(65) Prior Publication Data

US 2020/0327572 A1 Oct. 15, 2020

Related U.S. Application Data

(60) Provisional application No. 62/834,019, filed on Apr. 15, 2019.

(51) Int. Cl.
*G06Q 30/00* (2012.01)
*G06Q 30/0217* (2023.01)
*G06N 5/04* (2023.01)
*G07F 17/42* (2006.01)
*G06Q 30/04* (2012.01)

(52) U.S. Cl.
CPC .......... *G06Q 30/0218* (2013.01); *G06N 5/04* (2013.01); *G06Q 30/04* (2013.01); *G07F 17/42* (2013.01)

(58) Field of Classification Search
None
See application file for complete search history.

(56) References Cited

U.S. PATENT DOCUMENTS

| | | | | |
|---|---|---|---|---|
| 6,233,564 | B1* | 5/2001 | Schulze, Jr. | G06Q 30/0236 705/14.19 |
| 10,540,906 | B1* | 1/2020 | Fieldman | H04L 12/1822 |
| 11,238,479 | B1* | 2/2022 | Georgeson | G06Q 30/0212 |
| 2002/0178058 | A1* | 11/2002 | Ritchie | G06Q 30/0251 348/E7.071 |
| 2004/0220858 | A1* | 11/2004 | Maggio | H04H 20/38 725/32 |
| 2006/0224452 | A1* | 10/2006 | Ng | G06Q 30/0226 705/14.27 |
| 2007/0219654 | A1* | 9/2007 | Frink | G06Q 30/02 700/91 |
| 2008/0032277 | A1* | 2/2008 | Maggio | G09B 7/04 434/362 |
| 2008/0284097 | A1* | 11/2008 | Shepherd | A63F 3/00006 273/268 |

(Continued)

FOREIGN PATENT DOCUMENTS

EP 2151797 A1 * 2/2010 ............ G06Q 30/016

*Primary Examiner* — Luis A Brown
(74) *Attorney, Agent, or Firm* — Mughal IP P.C.

(57) ABSTRACT

Embodiments disclosed herein address these and other concerns by providing for means by which a customer's level of engagement with media can be determined. In particular, media and questions regarding the content of the media may be sent to a ticketing device and provided to the customer. The ticketing device can further obtain the customer's answers to the questions, and send the answers to a server, which can determine a level of engagement can be assessed from the answers and issue a discounted ticket. The amount of the discount may be proportional to the level of engagement.

18 Claims, 8 Drawing Sheets

Transit Media Distribution System
100

(56) References Cited

U.S. PATENT DOCUMENTS

| | | | | |
|---|---|---|---|---|
| 2011/0067044 A1* | 3/2011 | Albo | ............... | H04N 21/8186 |
| | | | | 725/13 |
| 2011/0234514 A1* | 9/2011 | Gothard | ............... | G07F 17/42 |
| | | | | 345/173 |
| 2011/0282724 A1* | 11/2011 | Hwang | ............... | G06Q 30/0217 |
| | | | | 705/14.19 |
| 2012/0109748 A1* | 5/2012 | Ahopelto | ............... | G06Q 30/02 |
| | | | | 705/14.66 |
| 2013/0060644 A1* | 3/2013 | Le | ............... | G06Q 30/0241 |
| | | | | 705/14.69 |
| 2013/0124257 A1* | 5/2013 | Schubert | ............... | G06Q 30/02 |
| | | | | 705/7.29 |
| 2013/0132156 A1* | 5/2013 | Grossman | ............... | G06Q 30/0204 |
| | | | | 705/7.32 |
| 2013/0282458 A1* | 10/2013 | Roberts | ............... | G06Q 30/0217 |
| | | | | 705/14.19 |
| 2014/0046858 A1* | 2/2014 | Werner | ............... | G06Q 30/01 |
| | | | | 705/304 |
| 2014/0249902 A1* | 9/2014 | Isaacson | ............... | G06Q 50/01 |
| | | | | 705/14.19 |
| 2015/0088644 A1* | 3/2015 | Shay | ............... | G06Q 30/0254 |
| | | | | 705/14.52 |
| 2015/0094139 A1* | 4/2015 | Kargar | ............... | A63F 13/61 |
| | | | | 463/29 |
| 2015/0193794 A1* | 7/2015 | Douglas | ............... | G06Q 30/0203 |
| | | | | 705/7.32 |
| 2015/0262088 A1* | 9/2015 | Smith | ............... | G06Q 30/06 |
| | | | | 705/5 |
| 2016/0063469 A1* | 3/2016 | Etzion | ............... | G07G 5/00 |
| | | | | 705/21 |
| 2017/0061502 A1* | 3/2017 | Zhang | ............... | G06Q 30/0277 |
| 2017/0072300 A1* | 3/2017 | Kim | ............... | A63F 13/63 |
| 2019/0034457 A1* | 1/2019 | Yang | ............... | G06F 3/0488 |
| 2019/0051205 A1* | 2/2019 | O'Sullivan | ............... | G09B 7/02 |
| 2019/0138330 A1* | 5/2019 | Wu | ............... | G06F 16/90332 |

* cited by examiner

MEDIA ENGAGEMENT VERIFICATION IN TRANSIT SYSTEMS

This application is a nonprovisional of and claims the benefit of priority to U.S. Provisional Patent Application No. 62/834,019, filed Apr. 15, 2019, entitled "TRANSIT DISCOUNTS FOR PROOF OF ADVERTISEMENT CONCENTRATION," the entire contents of which are herein incorporated by reference.

BACKGROUND

Transit systems often provide media to customers of the transit system, such as notices, warnings, or advertisements. To display this media, transit systems can use a mobile application or a web portal accessed by a customer's user device and/or a display on a transit vending machine. However, transit systems may have little or no way of knowing whether media is viewed.

BRIEF SUMMARY OF THE INVENTION

Embodiments disclosed herein address these and other concerns by providing for means by which a customer's level of engagement with media can be determined. In particular, media and questions regarding the content of the media may be sent to a ticketing device and provided to the customer. The ticketing device can further obtain the customer's answers to the questions, and send the answers to a server, which can determine a level of engagement can be assessed from the answers and issue a discounted ticket. The amount of the discount may be proportional to the level of engagement.

An example method of determining user engagement with media in a transit system, according to the description, comprises obtaining, at a ticketing device media, and one or more questions regarding the media. The one or more questions are specific to content of the media, and answers to the one or more questions are indicative of a level of the user engagement with the media. The method further comprises receiving a request at the ticketing device to purchase a transit ticket, and, in response to receiving the request, presenting the media with the ticketing device. The method further comprises presenting at least one of the one or more questions to a user using the ticketing device, receiving user input at the ticketing device, indicative of one or more answers to the at least one of the one or more questions, sending the one or more answers to a server; and issuing the transit ticket via the ticketing device. A purchase price of the transit ticket is reduced based on the one or more answers.

Another example method of determining user engagement with an media in a transit system, according to the description, comprises sending, to a ticketing device, media and one or more questions regarding the media. The one or more questions are specific to content of the media, and answers to the one or more questions are indicative of a level of the user engagement with the media. The method further comprises receiving, at a server from the ticketing device, one or more answers to the one or more questions, and issuing a transit ticket, wherein a purchase price of the transit ticket is discounted based on the one or more answers.

An example computer server, according to the description, comprises a communication interface, a memory, and one or more processors communicatively coupled with the communication interface and the memory. The one or more processors are configured to cause media and one or more questions regarding the media to be sent to a ticketing device, where the one or more questions are specific to content of the media, and answers to the one or more questions are indicative of a level of user engagement with the media. The one or more processors are further configured to receive, via the communication interface from the ticketing device, one or more answers to the one or more questions; and issue a transit ticket, where a purchase price of the transit ticket is discounted based on the one or more answers.

BRIEF DESCRIPTION OF THE DRAWINGS

For a more complete understanding of this invention, reference is now made to the following detailed description of the embodiments as illustrated in the accompanying drawings, in which like reference designations represent like features throughout the several views and wherein.

In the appended figures, similar components and/or features may have the same reference label. Further, various components of the same type may be distinguished by following the reference label by a dash and a second label that distinguishes among the similar components. If only the first reference label is used in the specification, the description is applicable to any or all of the similar components having the same first reference label irrespective of the second reference label.

DETAILED DESCRIPTION

Embodiments of the invention(s) described herein are generally related to transit system ticketing. That said, a person of ordinary skill in the art will understand that alternative embodiments may vary from the embodiments discussed herein, and alternative applications may exist. Alternative embodiments may be utilized in virtually any type of ticketing in which displaying media could be integrated, including tickets to museums, stadiums, or other such venues, and/or tickets for other types of transportation (taxi, airline travel, etc.). Moreover, although embodiments illustrate the use of a mobile device comprising a mobile phone, the playback of media in the collection of answers to questions may be performed by one or more mobile or immobile electronic devices that are not necessarily limited to a mobile phone. Ticket vending machines and/or other devices located within a transit system, which may be immobile, may be used in some embodiments. As used herein, the terms "media" and "media item" may comprise an image, text, and/or video, which may include advertisements. As used herein, the terms "ad," "advert," and "advertisement" are used interchangeably.

Ticketing in transit systems can leverage a customer's user device (e.g., a mobile phone or similar mobile device) to purchase and even use a ticket for transportation within the transit system. For example, a customer may use a mobile app executed by the customer's mobile phone to purchase a ticket. The mobile device can then use the ticket by displaying a barcode on the screen, transmitting a ticket identifier, and/or providing other information that may be scanned or otherwise accessed by machines or transit system employees before, during, or after transit.

Transit systems can engage media distributors to provide media to customers of the transit system. As noted, such media can include notices or warnings that may affect transit customers or the public at large. And thus, media distributors may comprise a transit provider, government agency, and so forth. Additionally, such media may comprise advertisements, in which case the media distributors may be advertisers. This not only can provide an additional source of revenue to the transit system and an additional audience for the advertiser, but can also be used to subsidize tickets purchased by the customers.

To provide this functionality, transit systems can enable the customer's mobile device (via the mobile app or a web portal accessed by the user device) or ticket vending machine to display media to customers. However, such media is often not well received by customers, and may not even be viewed. Customers may not feel as though they are being provided any service by the media, and media distributors may not know whether customers are even watching the media. Thus, the value provided by the transit system to both media distributor and customer is often questioned by both media distributor and customer.

Embodiments of the invention(s) described herein address these and other issues by providing a means by which customers may be shown media and further asked questions about them, granting them discounts according to the level of their participation, and providing answer data and analytics back to the media distributor. Accordingly, transit system is able to provide a clear value to both customer and media distributor, allowing all three parties to benefit from the showing of the media.

Figure 1:
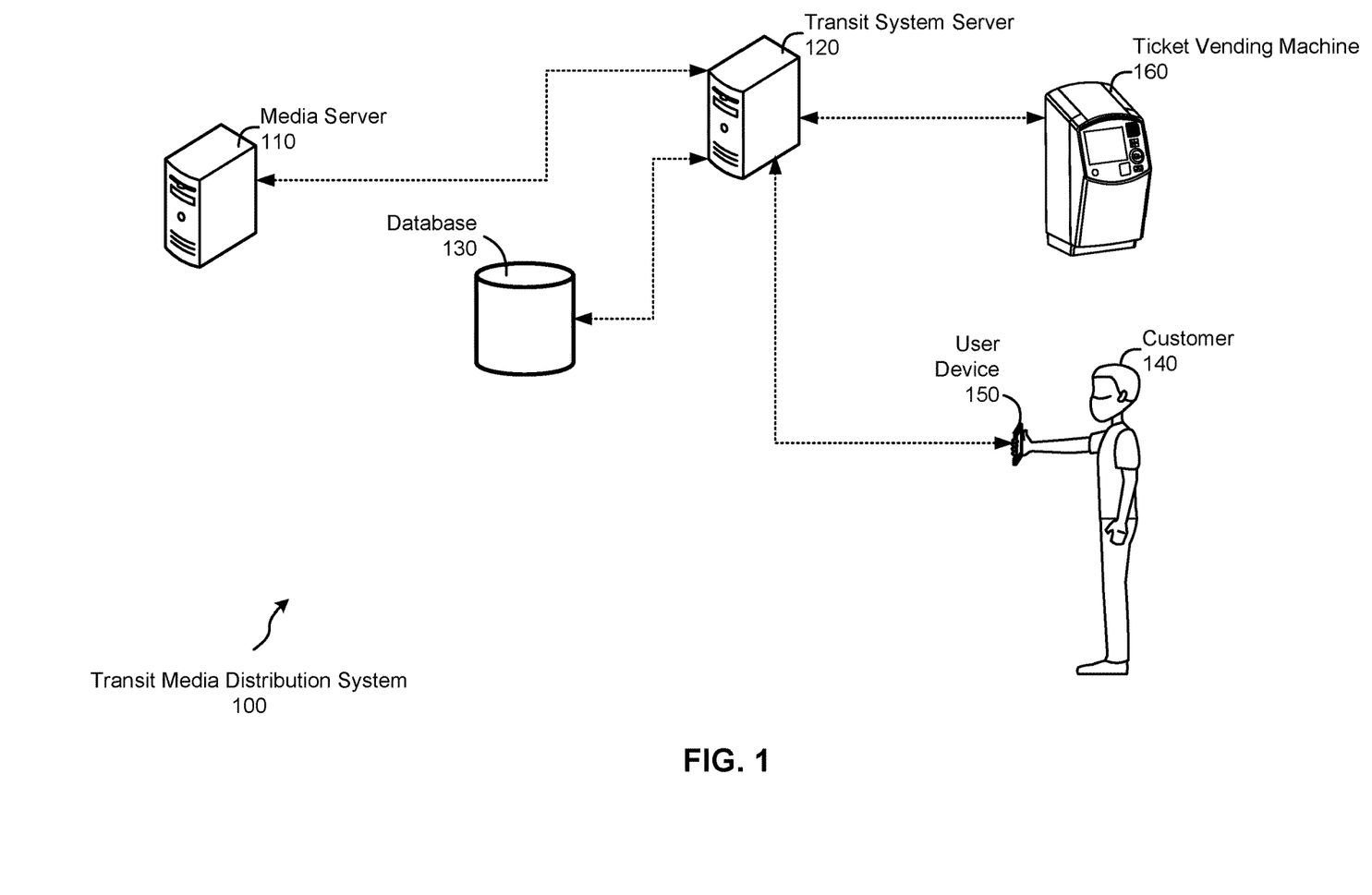
FIG. 1 is a diagram of a transit media distribution system, according to an embodiment.

FIG. 1 is a simplified diagram of a transit media distribution system 100, according to an embodiment. Here, the transit media distribution system 100 includes a media server 110, transit system server 120, and database 130. The transit system server 120 is further able to provide information to the customer 140 via a user device 150. It will be understood, however, that components of the transit media distribution system 100 may vary. The media server 110, transit system server 120, and/or database 130 may be implemented by one or more devices, which may be located in different physical and/or geographical locations. In some embodiments, for example, the advertiser server 110, system server 120, and/or database 130 can be executed "in the cloud," by one or more interconnected devices. Such devices may comprise a computer system, such as the computer system 500 illustrated in FIG. 5, which is subsequently described in further detail. Although a single user device 150 is illustrated, it will be understood that the transit media distribution system 100 may communicate with many user devices 150 (corresponding to many customers 140). The amount of user devices 150, therefore, can be dozens, hundreds, thousands, or millions (or more), depending on the application.

Additionally, it can be noted that a transit media distribution system 100 may have separate media servers 110 for separate media distributors. A transit system itself may have media (e.g., notices and warnings) to distribute among its customers, in which case the transit system may have a media server 110. Additionally or alternatively, a government agency or other entity may have public notices to distribute among transit customers, and therefore may have its own media server 110. Moreover, a transit media distribution system 100 capable of displaying advertisements to customers further may comprise one or more media servers 110 maintained and/or operated by one or more advertisers.

Dotted arrows between components shown in FIG. 1 illustrate communication links between the components. Such communication may comprise any of a variety of communication technologies, including wired and/or wireless technologies. As such, communication between components may be direct or indirect. Indirect communications may include one or more intervening devices and/or networks (not shown) between components, enabling the communication links. Such networks may comprise one or more private and/or public networks, including the Internet, which may utilize any of a variety of technologies, protocols, and/or communication standards to convey data between the various components as illustrated.

As previously indicated, the customer 140 may use the user device 150 to purchase and/or use tickets within a transit system. The user device 150 may comprise a mobile phone, tablet, laptop, wearable device, personal data assistant (PDA), or the like. Additionally, tickets can include, for example, tickets for bus, light rail, subway, ferry, and/or other transportation means, and may include any of a variety of ticket types, including single-use tickets, multi-use tickets (e.g., a 10-ride ticket), etc., which may be usable in the transit system within certain zones and/or at certain times/dates. As noted, purchase may be made via a mobile app or web portal accessible via the user device 150. Additionally, as previously noted, alternative embodiments may allow the customer 140 to purchase tickets and view media via a ticket vending machine 160.

Depending on desired functionality, ticket purchase may be linked to a transit account associated with the customer 140. The transit account may comprise data related to the customer's use of the transit system (e.g., name, account number, and/or other identifier; payment information; tickets and/or other transit products; travel information; etc.). The transit account may be stored on a database (e.g., database 130). For such account-based ticketing, the transit system may, when issuing a ticket to the customer 140, credit a ticket (or similar transit product) to the user account. The customer 140 may then access the ticket by accessing the user account via the user device 150.

The transit system server 120 can provide media, received from the media server 110 and stored on the database 130, to the user device 150 at various times before, during, or after a customer's transit. But as previously noted, it is uncertain whether the customer 140 has viewed or wants to view the media, and the media distributor may have no means by which to know whether the customer 140 was engaged with the media shown on the user device 150, and, if so, to what extent.

The embodiments provided herein utilize processes by which a ticketing device—such as the user device 150 or ticket vending machine 160—can incentivize a customer 140 to view media. Embodiments further provide for the determination of the level of engagement by the customer 140 with the media using one or more questions provided to the customer 140 about the media. (As used herein, the term "engagement" may generally refer to a customer's comprehension of a message conveyed by the media and/or other aspects of the media. Thus, the higher the customer's level of engagement, the more the customer comprehends the message and/or remembers the other aspects of the media.) FIGS. 2A-6 and the description that follows describe example embodiments of these processes and the hardware that can execute them.

Figure 2A:
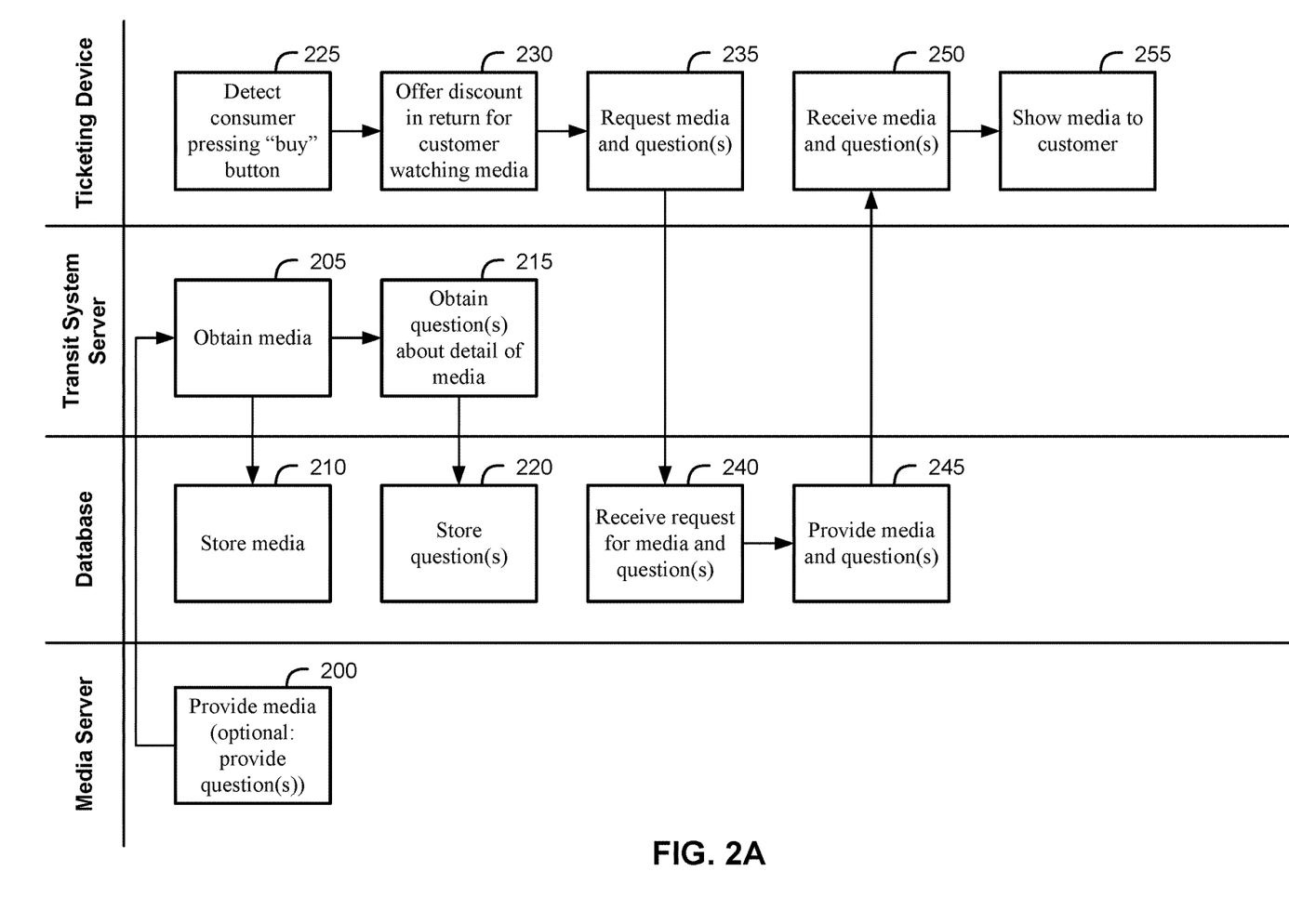
FIGS. 2A-2B are swim-lane diagrams illustrating an embodiment of how various components of the transit media distribution system can interact to implement a method for determining customer engagement with media, according to an embodiment.
Figure 2B:
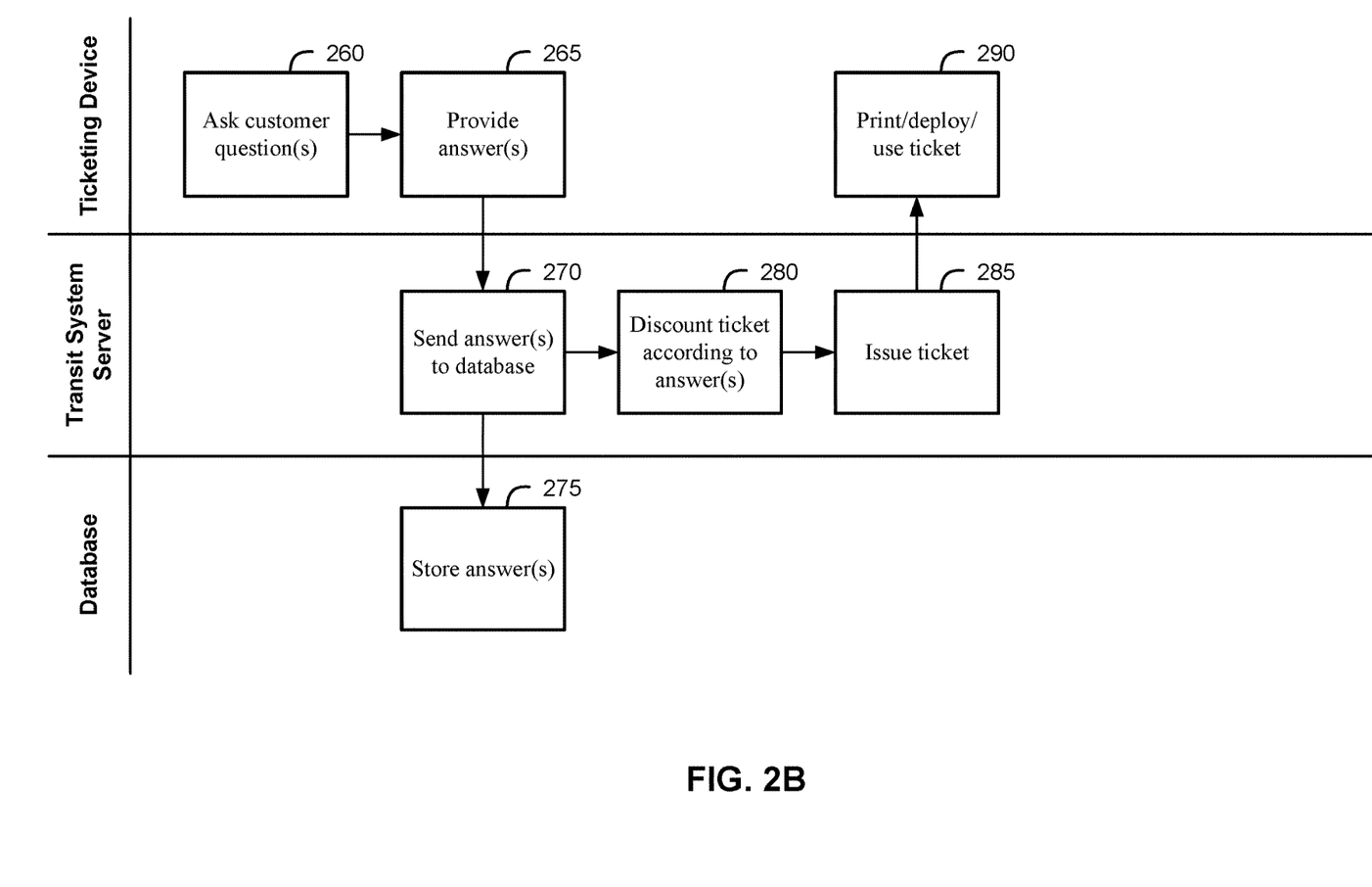

FIGS. 2A-2B are swim-lane diagrams illustrating an embodiment of how various components of the transit media distribution system 100 (in particular, the media server 110, database 130, transit system server 120, and ticketing device) can interact to implement a method for determining customer engagement with media, according to an embodiment. Here, the ticketing device may comprises a user device 150 or ticket vending machine 160. It will be understood, however, that alternative embodiments may add, omit, combine, separate, and/or rearrange the functions shown in the box is illustrated in FIGS. 2A and 2B, including executing some functions by different devices. The functionality of the ticketing device may be performed at the ticketing device and/or at a remote web server, depending on functionality. (As previously noted, the ticketing device may be capable of executing a local software app (e.g., a mobile app, if the ticketing device comprises a mobile device), in which case functions may be performed locally at the ticketing device. Additionally or alternatively, functions may be performed remotely by a web server or other server type, which may be accessed by a browser or other application executed on the ticketing device.)

At block 200, the media server provides media to the transit system server, which obtains the media at block 205, and provides the media to the database, which stores the media at block 210. The interaction between the media server and transit system server may vary, depending on desired functionality. In some embodiments, for example, the transit system server may first request media from the media server. In other embodiments, the media server may "push" media to the transit system server, or make media available to the transit system server periodically at a certain location (e.g., using a uniform resource locator (URL)) for download.

At block 215, the transit system server obtains one or more questions about the detail of the media. This can be done a variety of ways, depending on desired functionality. As indicated in block 200, the question(s) may be provided by the media distributor, in which case they may be communicated to the transit system server along with the media. In other embodiments, one or more employees of the transit system may view the media and form the one or more questions. In other embodiments, the media may be processed by the transit system server (and/or another computing system) capable of automatically generating questions based on content of the media. In any case, the questions obtained may be ultimately stored at the database, at block 220.

During the ticket purchase process, the ticketing device can determine that a customer intends to purchase a ticket (e.g., by detecting the customer has pressed a "buy" button, as shown in block 225), and then offer a discount in return for the customer watching (or otherwise engaging with) media, at block 230. If the customer agrees, the ticketing device can then request media and the associated one or more questions, at block 235. The request is received by the database at block 240, which then provides the ad and question(s) at block 245, which are then received by the ticketing device at block 250, which then shows the ad to the customer 255. It can be noted that, in alternative embodiments, the transit system server may interface with the ticketing device, such that communications between the ticketing device and database are made via the transit system server.

The format of the media and question(s) may vary, depending on the type of media. Media may comprise, for example, a video, print (text), a graphic or image, a banner or other overlay, and/or other media type. The associated question(s) may therefore be dependent on the media type. Some questions and/or question types related to a video, for example, may not be relevant for text, or vice versa.

FIG. 2B continues with the process illustrated in FIG. 2A. At block 260, the ticketing device can then present the customer with the question(s). In some instances, for example, there may be a single question about the content. In other instances, there can be many questions. A question can be about the substance of the message of the media content (e.g., questions related to what is being sold, what is being said, etc.) and/or about items not related to the message of the content (e.g., questions related to what characters appearing in the media are wearing, how many characters there are, etc.). The customer's answers to these questions can ultimately indicate to the transit system and/or media distributor the level of engagement or concentration the customer had while viewing (or not viewing) the media. Some questions may relate to what was conveyed audibly, while others may relate to what was shown visibly, to determine whether a person listens to and/or watch the media. Additionally or alternatively, questions may become increasingly more difficult, which, again, may provide for a determination of the level of engagement or concentration the customer had while viewing the media.

According to some embodiments, the user may determine when to stop the questioning, opting out of further questions, if desired. For example, after each answer is provided, the user may be prompted to continue with the questioning. Additionally or alternatively, the ticketing device may have an "exit" button on a graphical user interface that the customer may press editing time to exit the questioning.

The method and format in which the customer is asked the questions at block 260 may vary, depending on desired functionality. In some embodiments, the questions may simply be provided in text on a display of the ticketing device (e.g., in a graphical user interface). In other embodiments, the questions may be asked audibly, provided in video (with audio), and/or the like. Questions may be true or false, multiple choice, fill in the blank, etc.

According to some embodiments, the ticketing device can ask a limited number of questions at block 260, retrieving a small subset of questions from a large pool of questions about the media. That is, for a particular media item, there may be dozens of questions stored in the database 130 regarding the particular media item, but the ticketing device may select only a small handful of questions to ask the customer at block 260. This selection of the questions to ask may be random, or may be based on any prior viewing of the particular media item (or a related media), to help reduce the likelihood that, if a customer is shown the particular media item more than once, the customer will receive the same question(s). In some embodiments, the ticketing device and/or transit system server may determine which questions a customer has been asked so that, if the user is subsequently shown the same advertisement, the ticketing device may be able to ask a different set of questions.

Additionally, generic questions may also be provided to the customer, to help the advertiser provide more relevant media. These questions can include, for example, questions regarding whether the customer felt the media was useful or relevant. For notices or warnings, for example, this may help with the transit system determine whether such notices or warnings are relevant to customers, given a customer's transit (e.g., whether the notice/warning is relevant to a customer's course of travel, method of travel, etc.). For advertisements, questions regarding relevance may help the transit system and/or advertiser determine whether the customer had any interest in the product/service, etc. These questions may not necessarily provide an indication of the level of engagement the customer may have had with the advertisement (although some may provide some indication of a minimal level of engagement) however, these questions may nonetheless be useful to the advertiser, and, in some embodiments, also may be used to provide discounts to the customer, if answered.

At block 265, the ticketing device provides the answer(s) received from the customer to the transit system server. The method in which the ticketing device receives the answers from the customer may vary, depending on a type of user interface used by the ticketing device. For example, the ticketing device may have a display, in which case questions may be presented via a graphical user interface on the display. The answer(s) may be received in such instances via buttons on the display (if it is a touchscreen) or via some other input. Other inputs may include buttons, switches, audible inputs, visible inputs (gestures), or the like. This may vary depending on the capabilities of the ticketing device.

After it receives the answers, the transit system server then sends the answer(s) to the database at block 270. The database, in turn, stores the answer(s), as shown at block 275. (As will be discussed herein below, the answers ultimately can be provided to the media distributor to indicate the level of engagement the customer had with the media.)

At block 280, the transit system server then discounts the ticket according to the answer(s) provided by the customer. The level of discount can vary, depending on factors such as the terms of an agreement between the media distributor and transit system, amount of questions answered, the difficulty of the questions answered, and the like. In general, the more questions correctly answered by the customer, the larger the discount. As an example, each correctly-answered question may result in a discount of $0.10 or more. With a total of five questions asked to the customer, this can result in a total discount of $0.50 per trip. That said, other types of discounting may be employed, such as higher discounts for more difficult questions, different types of discounts for different types of media (e.g., different discounts for notices than for advertisements), and so forth.

For customers traveling via transit on a daily basis, offering discounts in the manner described in the embodiments provided herein can result in significant savings over time. Additionally, the transit system may be able to receive higher fees from the media distributor by providing proof of customers' engagement with the media. Moreover, the media distributor receives assurance that media is being watched or viewed, and can receive additional analytical information, as indicated in further detail below. Thus, the media distributor, transit system, and customer can each receive added value from the techniques for determining customer engagement with media as provided herein.

At block 285, the transit system server issues the ticket, which is then printed, displayed and/or otherwise used by the ticketing device at block 290. The functionality at block 285 may be additionally in response to a transaction in which a customer pays for the ticket using a credit card, debit card, account value, or other source.

The ticket itself may come in a variety of forms, depending on desired functionality and capabilities of the transit system. An account-based transit systems, for example, the ticket may be provided as a credit to the customer's account (in which case the ticketing device may display or otherwise provide a confirmation to the customer that the ticket has been credited). In such instances, the customer may use the ticket by presenting a smart card, mobile device, or other item or device capable of providing a unique identifier associated with the customer's account, thereby allowing the transit system to identify the customer's account and (after granting the customer passage) remove the ticket or mark the ticket as used. Additionally or alternatively, in scenarios in which the ticketing device comprises a ticket vending machine 160, the ticket vending machine 160 may print a physical ticket for the customer. For embodiments in which the ticketing device comprises a mobile user device 150 (e.g., mobile phone), the user device 150 can, for example, show the ticket as a barcode on its display, transmit ticket information via radio frequency (RF) signal (e.g., via Bluetooth, near-field communication (NFC), Wi-Fi, etc., which may be read by a ticket reader at a gate or other access point within the transit system), and/or the like. In alternative embodiments, it can be noted that the ticketing device may perform one or more of the functions in blocks 270, 280, and/or 285, depending on desired functionality. Additionally or alternatively, more than one ticket may be issued at block 285, if the customer is purchasing the plurality of tickets. In some embodiments, a number of questions asked at block 260 may be dependent on the number of tickets for purchase.

It can be noted that some embodiments may enable the customer to watch multiple media items. That is, blocks 235-275 can be repeated for each media item watched by the customer, prior to the discounting of the ticket at block 280. This may be a useful feature in embodiments in which the ticketing device comprises a user device 150 (rather than a ticket vending machine 160), allowing a customer to engage with multiple media items without running the risk of preventing the next customer from using the ticketing device (which would be the case if the ticketing devices a ticket vending machine 160). For embodiments in which the customer watches multiple media items, the customer may be questioned after each media item regarding the respective media item, or questions regarding all media items may be presented to the customer after all media items are shown to the customer.

Figure 3:
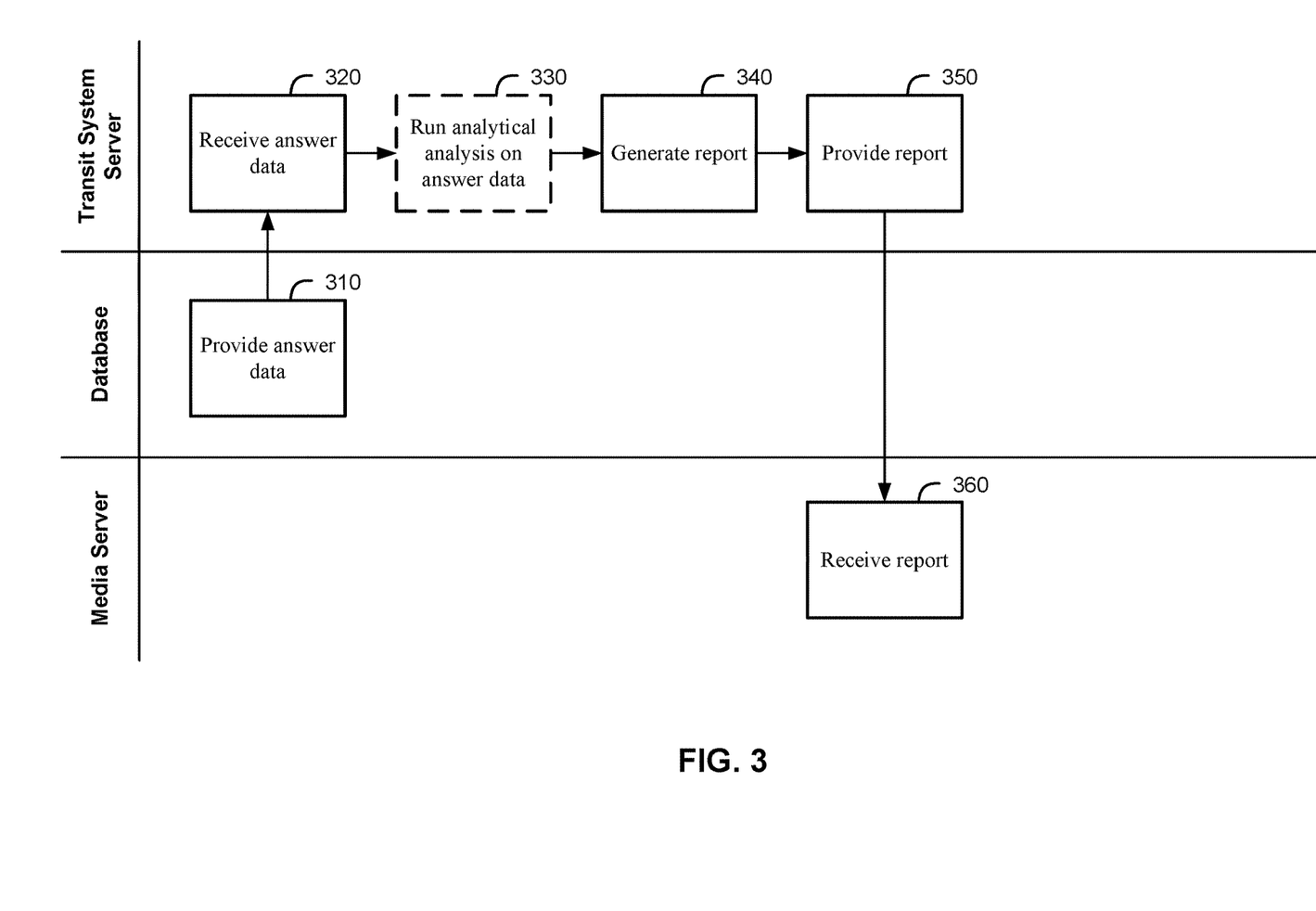
FIG. 3 a swim-lane diagram illustrating how various components of a transit media distribution system can interact to provide the media distributor with a report of answer data from customers, according to an embodiment.

FIG. 3 is a swim-lane diagram illustrating how various components of a transit media distribution system 100 can interact to provide the media distributor with a report of answer data from customers, according to an embodiment. Alternative embodiments may vary.

The process illustrated in FIG. 3 may be employed in any of a variety of ways. For example, in some embodiments, reports may be provided periodically (e.g., every day, week, month, etc.). Additionally or alternatively, reports may be provided on a schedule, and/or provided based on a triggering event (e.g., a request from the media distributor). Furthermore, a transit media distribution system 100 that distributes media for multiple media distributors may provide reports to each of the media distributors in a different manner, if so desired. (This may not only include when the reports are provided, but the formatting and content of the report.) The manner in which reports are provided may be based on an agreement between the transit media distribution system 100 and the respective media distributor.

Here, the database provides the answer data at block 310 to the transit system server, which receives it at block 320. The answer data may comprise answers from a specific customer about a specific media item, answers from a specific customer about many media items, answers from many customers about a specific media item, and/or answers from many customers about many media items.

Optionally, at block 330, the transit system server can run an analytical analysis on the answer data. This can be, for example, an additional service that the transit system provides to the advertiser to allow the media distributor to determine the effectiveness of the media. For example, the analytical analysis can provide insight regarding which answers and/or types of answers are most correctly answered, which are least correctly answered, which types of media appear most effective at conveying a desired message based on amount of correct answers, and the like.

At block 340, the transit system server generates a report for the media distributor, based on the answer data. The report may, for example, be provided in a format requested by the media distributor. In the case where analytics is run (at block 330) the report generated may include the resulting analytics. At block 350, the transit system server then provides the media server with the report, which is received at block 360.

Figure 4:
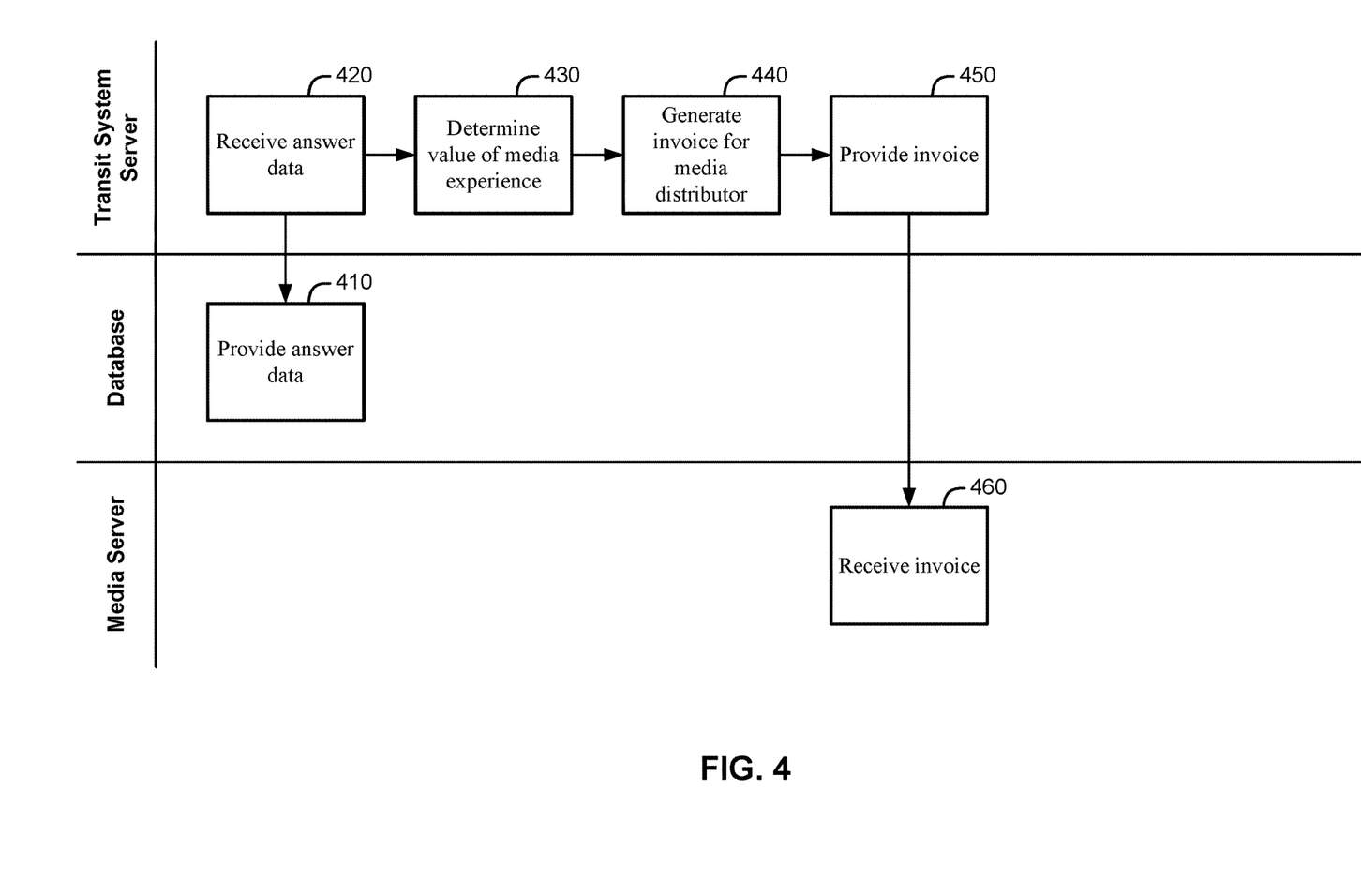
FIG. 4 is a swim-lane diagram illustrating how various components of a transit media distribution system can interact to provide the media distributor with a report of answer data from customers, according to an embodiment.

FIG. 4 is a swim-lane diagram illustrating how various components of a transit media distribution system 100 can interact to provide the media distributor with an invoice based on answer data from customers, according to an embodiment. Again, alternative embodiments may vary from the functionality illustrated in FIG. 4. Moreover, as with the functionality of FIG. 3, the content and formatting of the invoice, as well as the timing with which invoices are created, they vary from one media distributor to the next.

At block 410, the database provides the transit system server with answer data, which is received by the transit system server at block 420. (In alternative embodiments, the transit system server may receive answer data directly from the ticketing device.) At block 430, the transit system server determines the value of a media experience, which can be calculated based on an agreement between the media distributor and transit system. Here, the media experience comprises the showing of the media to the customer and the customer's level of engagement with the media. Similar to the discounting of a transit ticket for the customer, the value of the media experience can be determined based on the amount of questions correctly answered by the customer, the difficulty of the questions correctly answered, or the like. This value may be slightly higher than the amount of discount provided to the customer, allowing the transit system to receive some monetary benefit from providing the functionality of the embodiments described herein. (In other words, the value of the media experience determined in 430 may include a margin of profit for the transit system, which may be dependent on an agreement of such between the media distributor and the transit system.)

At block 440, the transit system server can generate an invoice for the media distributor, based on the value of the media experience, and provide the invoice at block 450 to the media server, which receives the invoice at block 460. Depending on desired functionality, the functionality at blocks 430-460 may be performed in batches, on a periodic basis (e.g., daily, weekly, monthly, etc.).

The committee noted that, in some embodiments, the reporting in FIG. 3 and/or the invoicing in FIG. 4 may be provided to the media distributor in a different manner. That is, rather than sending the report or invoice to the media server, the report or invoice may be sent to another computer server maintained and/or operated by the media distributor. Additionally or alternatively, the reporter invoice may be sent by traditional means (e.g., via email or physical mail was print.

Figure 5:
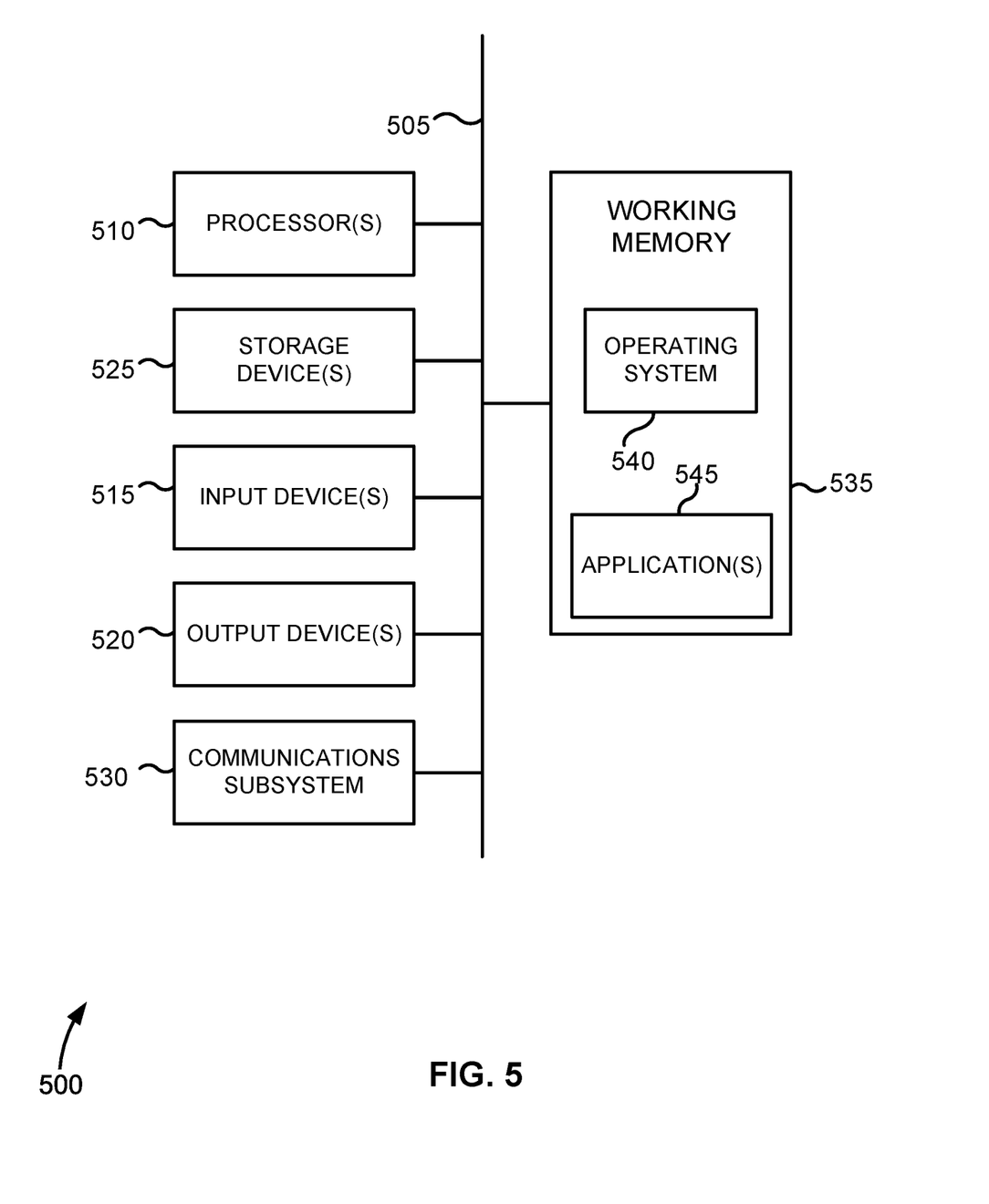
FIG. 5 is a block diagram of a computer system, according to some embodiments of the present disclosure.

FIG. 5 is a simplified block diagram of a computer system 500, according an embodiment. A computer system 500 as illustrated in FIG. 5 may, for example, may correspond with and/or be integrated into one or more components of a transit media distribution system 100, including a media server 110, transit system server 120, database 130, user device 150, and/or ticket vending machine 160. FIG. 5 provides a schematic illustration of one embodiment of a computer system 500 that can perform some or all of the steps of the methods provided by various embodiments, including functions illustrated in FIGS. 2A-4 and FIGS. 6 and 7 (described in more detail below). It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505, or may otherwise be in communication, as appropriate. The hardware elements may include one or more processors 510, including without limitation one or more general-purpose processors (e.g., CPUs) and/or one or more special-purpose processors such as digital signal processing chips, graphics acceleration processors (e.g., GPUs), and/or the like; one or more input devices 515, which can include without limitation a mouse, a keyboard, a camera, a touchscreen, and/or the like; and one or more output devices 520, which can include without limitation a display device and/or the like.

The computer system 500 may further include and/or be in communication with one or more non-transitory storage devices 525, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 500 might also include a communication interface 530, which can include without limitation a modem, a network card (wireless or wired), an infrared communication device, a wireless communication device, and/or a chipset, and/or the like. The communication interface 530 may include one or more input and/or output communication interfaces to permit data to be exchanged with other computer systems and/or any other devices described herein.

The computer system 500 also can include software elements, shown as being currently located within the working memory 535, including an operating system 540, device drivers, executable libraries, and/or other code, such as one or more application programs 545, which may comprise computer programs provided by various embodiments, and/ or may be designed to implement methods, and/or configure systems, provided by other embodiments, as described herein. Merely by way of example, all or part of one or more procedures described with respect to the methods discussed above, and/or methods described in the claims, might be implemented as code and/or instructions executable by a computer and/or a processor within a computer. In an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 525 described above. In some cases, the storage medium might be incorporated within a computer system, such as computer system 500. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 500 to perform methods in accordance with various embodiments of the technology. According to a set of embodiments, some or all of the procedures of such methods are performed by the computer system 500 in response to processor(s) 510 executing one or more sequences of one or more instructions, which might be incorporated into the operating system 540 and/or other code, such as an application program 545, contained in the working memory 535. Such instructions may be read into the working memory 535 from another computer-readable medium, such as one or more of the storage device(s) 525. Merely by way of example, execution of the sequences of instructions contained in the working memory 535 might cause the processor(s) 510 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 525. Volatile media include, without limitation, dynamic memory, such as the working memory 535.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communication interface 530 and/or components thereof generally will receive signals, and the bus 505 then might carry the signals and/or the data, instructions, etc. carried by the signals to the working memory 535, from which the processor(s) 510 retrieves and executes the instructions. The instructions received by the working memory 535 may optionally be stored on a non-transitory storage device 525 either before or after execution by the processor(s) 510.

Figure 6:
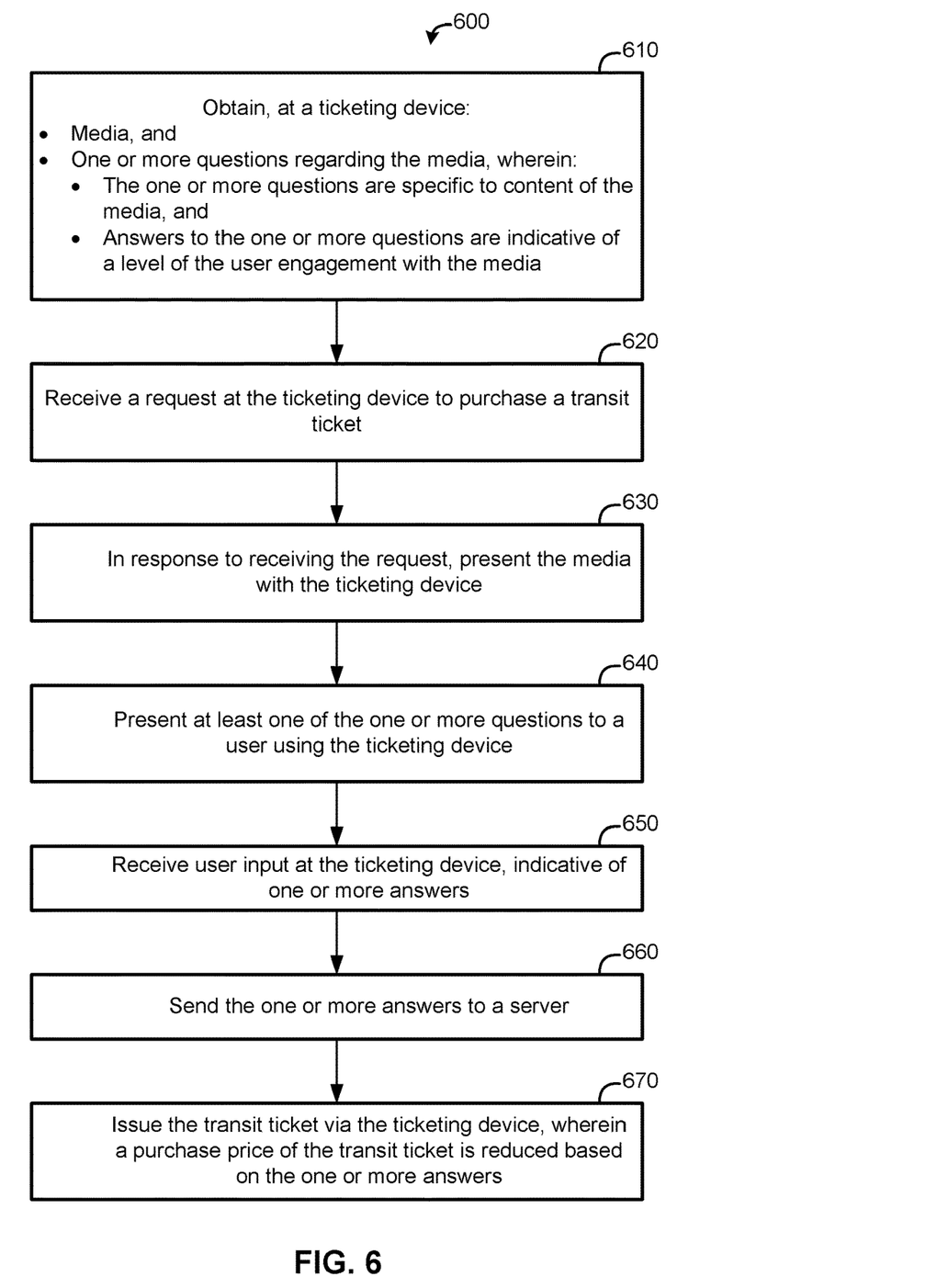
FIG. 6 is a flow diagram of a method of determining user engagement with media in a transit system, according to an embodiment.

FIG. 6 is a flow diagram of a method 600 of determining user engagement with media in a transit system, according to an embodiment. The functionality described in one or more blocks illustrated in FIG. 6 may be performed by software and/or hardware components of a ticketing device. As such, according to some embodiments, means for performing one or more of the functions illustrated in the blocks of FIG. 6 may comprise one or more of the components of a computer system, as illustrated in FIG. 5 and described above. Furthermore, it will be appreciated that alternative embodiments may combine and/or separate the functions illustrated, or otherwise perform them in a different manner (including simultaneously), depending on desired functionality.

The functionality at block 610 comprises obtaining, at a ticketing device, media, and one or more questions regarding the media. The one or more questions are specific to the content of the media, and answers to the one or more questions are indicative of the level of the user engagement with the media. As previously noted, obtaining the media and the one or more questions may comprise receiving the media and the one or more questions from a media server. Moreover, depending on desired functionality, the media and/or questions may be obtained prior to a ticket purchase process, or may be obtained on demand upon determining a user wants to purchase a ticket. Finally, as previously noted, a ticketing device may comprise a user device (e.g., a user's mobile phone or other personal device), or a ticket vending machine (or other terminal) operated by a transit system.

The functionality at block 620 comprises receiving a request at the ticketing device to purchase a transit ticket. This request may comprise a user input, such as the user selecting a ticket for purchase using a graphical user interface of the ticketing device. To receive this input, the ticketing device may execute a software application, such as a web browser (accessing a web portal) or transit application, which may provide a graphical user interface to the user, enabling ticket purchase.

At block 630, the functionality comprises, in response to receiving the request, presenting the media with the ticket device. Depending on the type of media, the media may be presented using a display via a graphical user interface of the ticketing device, which may comprise the same graphical user interface used for ticket purchase. Again, the media may comprise text, graphics, video, and/or other content for the user. The media may convey a warning or notice from the transit system, a government agency (or other government body), or may comprise an advertisement. If the media comprises video and/or audio, presenting the media may comprise playing back the video and/or audio. In some embodiments, a user may be given certain video playback controls, such as rewind, pause, resume, and/or fast-forward. If the media comprises text or still images, presenting the media may comprise showing the media for a predetermined amount of time, or for a minimum threshold of time before a user is able to continue with the ticket purchase (e.g., by selecting a "next" or "close" button in the graphical user interface).

The functionality at block 640 comprises presenting at least one of the one or more questions to a user using the ticketing device. In some embodiments, the method of presenting the questions may be similar to the method of presenting the media itself. That is, questions may be presented by the ticketing device to a user by means of text, audio and/or video, or the like. As previously noted, according to some embodiments, the user may decide how many questions to answer (e.g., by choosing additional questions or stopping further questioning via controls on a graphical user interface).

At block 650, the functionality comprises receiving user input at the ticketing device, indicative of one or more answers to the at least one of the one or more questions presented in block 640. The type of input received from the user may depend on the type of questions presented. That is, and answer may comprise a true or false selection, multiple-choice selection, fill in the blank input, etc., based on a corresponding type of question presented.

At block 660, the one or more answers are sent to a server. The server may comprise, for example, server operated or maintained by the transit system. More specifically, the server may be capable of issuing a transit ticket or working with a ticket-issuing server or system to adjust the purchase price of the ticket based on the one or more answers.

At block 670, the transit ticket is issued via the ticketing device, and a purchase price of the transit ticket is reduced based on the one or more answers. Again, the amount of the reduction in the purchase price may be reflective of the user's level of engagement, which is reflected in the number of correct answers and/or difficulty of the questions correctly answered.

The issuance of the ticket via the ticketing device may vary, depending on the type of ticketing device, type of ticket issued, and/or other factors. As noted in the above-described embodiments, the ticket vending machine may print a physical ticket. Additionally or alternatively, the ticketing device may indicate, via the ticketing device, the issuance of the ticket to a user account (in which case the user may utilize a pre-existing smartcard, smartphone, or other item or device to use the ticket). In some embodiments, issuing the transit ticket may comprise displaying the ticket (e.g., as a Quick Response (QR) code, barcode, etc.) on the display of a mobile device.

Figure 7:
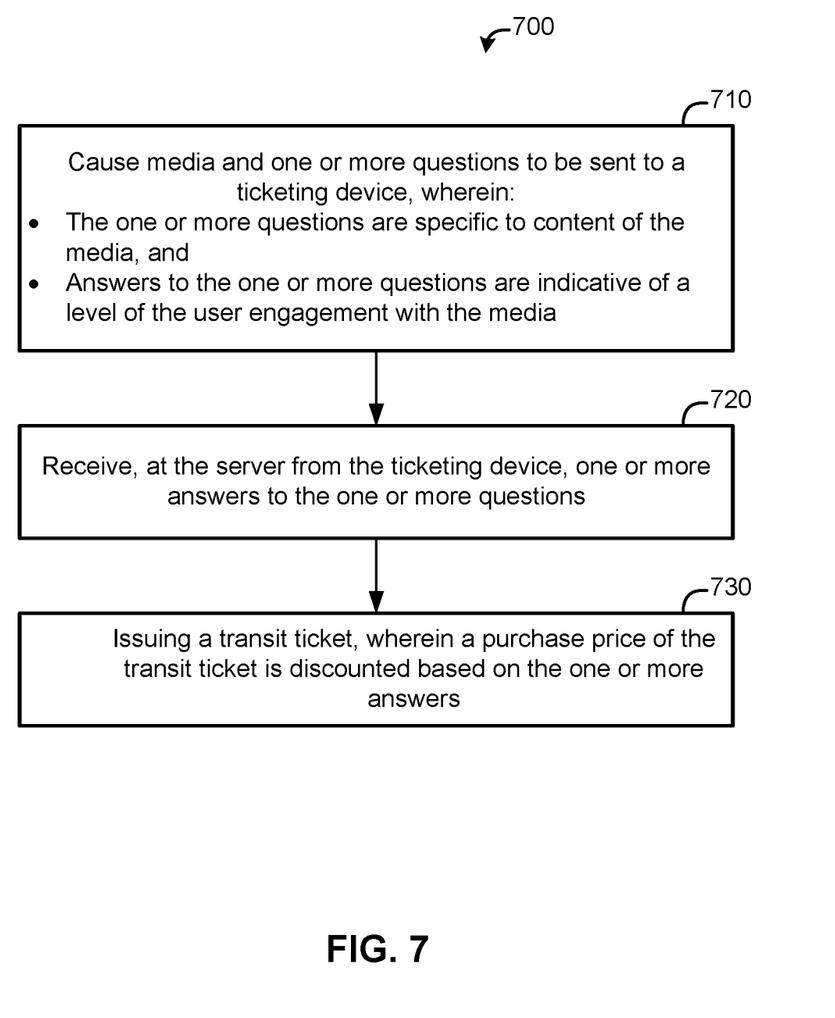
FIG. 7 is a flow diagram of another method of determining user engagement with media in a transit system, according to an embodiment.

FIG. 7 is a flow diagram of another method 700 of determining user engagement with media in a transit system, according to an embodiment. Here, the functionality described in one or more blocks may be performed by software and/or hardware components of a transit system server. As such, according to some embodiments, means for performing one or more of the functions illustrated in the blocks of FIG. 7 may comprise one or more of the components of a computer system, as illustrated in FIG. 5 and described above. Furthermore, it will be appreciated that alternative embodiments may combine and/or separate the functions illustrated, or otherwise perform them in a different manner (including simultaneously), depending on desired functionality.

At block 710, the functionality comprises causing media and one or more questions regarding the media to be sent to a ticketing device. As illustrated in FIG. 2A, the media and questions may be sent from a database. Additionally or alternatively, they may be sent from the transit system server. In some embodiments, the transit system server may cause the media and/or questions to be sent to the ticketing device by sending these items directly to the ticketing device or sending information to the ticketing device regarding the location (e.g., a URL) from which the media and/or questions may be downloaded. Again, the one or more questions are specific to the content of the media, and answers to the one or more questions are indicative of a level of user engagement with the media. As noted in the previously-described embodiments, the media may be obtained by the transit system server from a media server maintained by a media distributor. In some embodiments, the one or more questions regarding the media may also come from the media distributor (e.g., via the media server).

At block 720, the functionality comprises receiving, at the server from the ticketing device, one or more answers to the one or more questions. As described in the embodiments above, these answers may be obtained from a user via a user interface (e.g., a graphical user interface) at the ticketing device.

At block 730, the method 700 comprises issuing a transit ticket, wherein a purchase price of the transit ticket is discounted based on the one or more answers. As previously noted, the amount of the discount can be proportional to the user's level of engagement, reflected in the amount of questions correctly answered and/or difficulty of the correctly-answered questions. In some embodiments, the server may issue the transit ticket by causing the ticketing device to show, on a display of the ticketing device, the ticket. (This may be done, for example, by sending information regarding the issued transit ticket to the ticketing device.) Additionally or alternatively, issuing the transit ticket may comprise crediting the transit ticket to an account associated with the user.

As previously described, embodiments may employ one or more additional functions, depending on desired functionality. In some embodiments, for example, the method 700 may further comprise sending, to the ticketing device from the server, one or more additional questions, wherein the one or more additional questions are questions regarding relevance of the media. In some embodiments, these questions may be presented to a user along with the one or more questions regarding the media. Likewise, the answers may be received along with the answers to the one or more questions regarding the media.

In some embodiments, a server may be capable of generating reports and/or invoices in the manner described above with regard to FIGS. 3 and/or 4. As such, some embodiments of the method 700 may further comprise generating a report based on the one or more answers from the ticketing device and providing the report to a media distributor. Additionally or alternatively, the method 700 may comprise analyzing the one or more answers from the ticketing device to determine analytical information, and including, in the report, the analytical information. In some embodiments, the method 700 may further comprise determining a value of a media experience, based on the one or more answers from the ticketing device, generating an invoice based on the determined value, and providing the invoice to a media distributor.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups. As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A method of determining user engagement with a media in a transit system, the method comprising:
   obtaining, at a ticketing device:
      the media, and
      one or more questions regarding the media, wherein:
         the one or more questions are specific to content of the media, and
         answers to the one or more questions are indicative of a level of the user engagement with the media;
   receiving a request at the ticketing device to purchase a transit ticket;
   in response to receiving the request, presenting the media with the ticketing device;
   presenting at least one of the one or more questions to a user using the ticketing device, wherein a first set of the one or more questions correspond to information conveyed audibly, and a second set of the one or more questions correspond to information shown visibly, to determine whether the user listens to and/or watches the media;
   receiving user input at the ticketing device, indicative of one or more answers to the at least one of the one or more questions;
   sending the one or more answers to a server;
   performing, by the server, analytical analysis on the one or more answers including types of answers that are most correctly answered, least correctly answered, and types of media, watched or listened to, that appear most effective at conveying a desired message based on amount of correctly answers; and
   issuing the transit ticket via the ticketing device, wherein a purchase price of the transit ticket is reduced based on the one or more answers, and a discount amount in purchase price of the transit ticket is proportional to correctly-answered questions and difficulty of correctly-answered questions.

2. The method of claim 1, further comprising offering, with the ticketing device, a discount in return for a display of the media, wherein displaying the media is further in response to an affirmative response to the offering.

3. The method of claim 1, wherein obtaining the media and the one or more questions at the ticketing device comprises receiving the media and the one or more questions from a database.

4. The method of claim 1, wherein presenting the at least one of the one or more questions to the user using the ticketing device further comprises presenting controls for the user to select whether to receive more questions.

5. A method of determining user engagement with a media in a transit system, the method comprising:
   sending, to a ticketing device:
      the media, and
      one or more questions regarding the media, wherein:
         the media and the one or more questions are presented using the ticketing device, wherein a first set of the one or more questions correspond to information conveyed audibly, and a second set of the one or more questions correspond to information shown visibly, to determine whether the user listens to and/or watches the media,
         the one or more questions are specific to content of the media, and
         answers to the one or more questions are indicative of a level of the user engagement with the media;
   receiving, at a server from the ticketing device, one or more answers to the one or more questions;
   performing by the server, analytical analysis on the one or more answers including types of answers that are most correctly answered, least correctly answered, and types of media, watched or listened to, that appear most effective at conveying a desired message based on amount of correct answers; and issuing a transit ticket via the ticketing device, wherein a purchase price of the transit ticket is discounted based on the one or more answers, and a discount amount in purchase price of the transit ticket is proportional to correctly-answered questions and difficulty of correctly-answered questions.

6. The method of claim 5, further comprising sending, to the ticketing device from the server, one or more additional questions, wherein the one or more additional questions are questions regarding relevance of the media.

7. The method of claim 5, further comprising:
generating a report based on the one or more answers from the ticketing device; and
providing the report to a media distributor.

8. The method of claim 7, further comprising:
analyzing the one or more answers from the ticketing device to determine analytical information; and
including, in the report, the analytical information.

9. The method of claim 5, further comprising:
determining a value of a media experience, based on the one or more answers from the ticketing device;
generating an invoice based on the determined value; and
providing the invoice to a media distributor.

10. The method of claim 5, wherein issuing the transit ticket comprises causing the ticketing device to show, on a display of the ticketing device, the ticket.

11. The method of claim 5, wherein issuing the transit ticket comprises crediting the ticket to an account associated with the user.

12. A computer server comprising:
a communication interface;
a memory; and
one or more processors communicatively coupled with the communication interface and the memory, wherein the one or more processors are configured to:
cause a media and one or more questions regarding the media to be sent to a ticketing device wherein:
the media and the one or more questions are presented using the ticketing device, wherein a first set of the one or more questions correspond to information conveyed audibly, and a second set of the one or more questions correspond to information shown visibly, to determine whether the user listens to and/or watches the media,
the one or more questions are specific to content of the media, and
answers to the one or more questions are indicative of a level of user engagement with the media;
receive, via the communication interface from the ticketing device, one or more answers to the one or more questions;
perform analytical analysis on the one or more answers including types of answers that are most correctly answered, least correctly answered, and types of media that appear most effective at conveying a desired message based on amount of correct answers; and
issue a transit ticket via the ticketing device, wherein a purchase price of the transit ticket is discounted based on the one or more answers, and a discount amount in purchase price of the transit ticket is a function of correctly-answered questions and difficulty of correctly-answered questions.

13. The computer server of claim 12, wherein the one or more processors are further configured to cause one or more additional questions to be sent to the ticketing device, wherein the one or more additional questions are questions regarding relevance of the media.

14. The computer server of claim 12, wherein the one or more processors are further configured to:
generate a report based on the one or more answers from the ticketing device; and
send the report to a media distributor via the communication interface.

15. The computer server of claim 14, wherein the one or more processors are further configured to:
analyze the one or more answers from the ticketing device to determine analytical information; and
include, in the report, the analytical information.

16. The computer server of claim 12, wherein the one or more processors are further configured to:
determine a value of a media experience, based on the one or more answers from the ticketing device;
generate an invoice based on the determined value; and
provide, via the communication interface, the invoice to a media distributor.

17. The computer server of claim 12, wherein the one or more processors are further configured to, wherein issuing the transit ticket comprises causing the ticketing device to show, on a display of the ticketing device, the transit ticket.

18. The computer server of claim 12, wherein the one or more processors are further configured to, wherein issuing the transit ticket comprises crediting the transit ticket to an account associated with a user.

* * * * *